INVENTOR
G.B.Hern

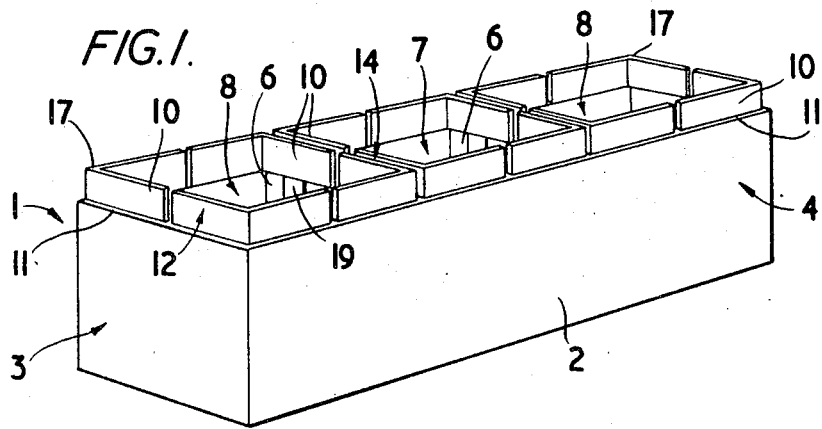
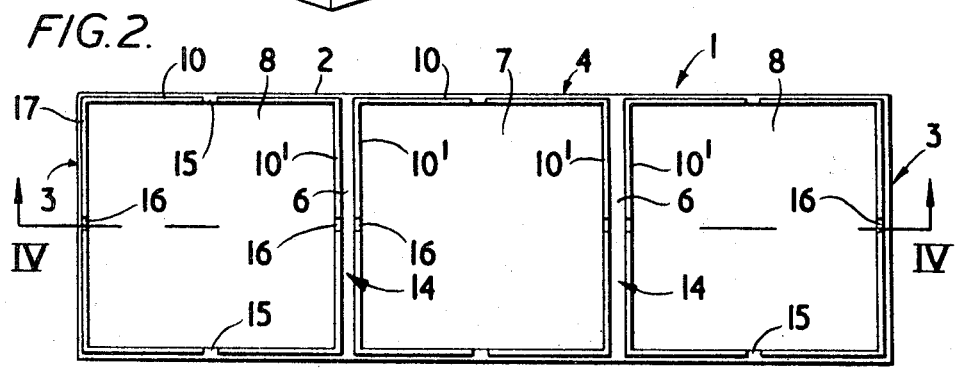
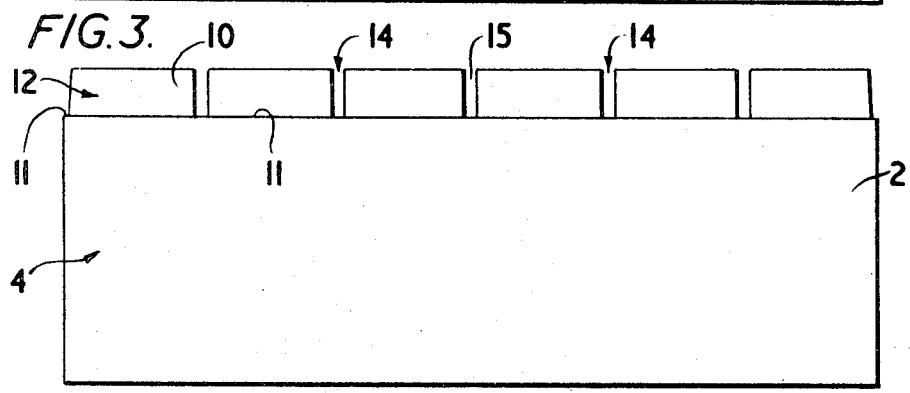
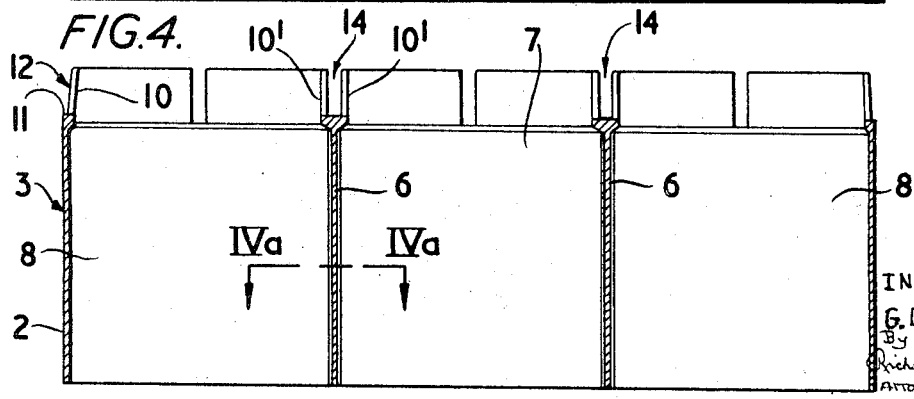

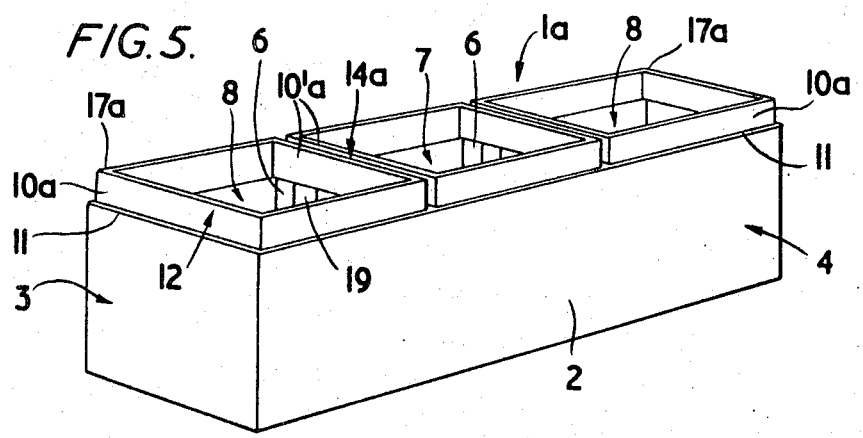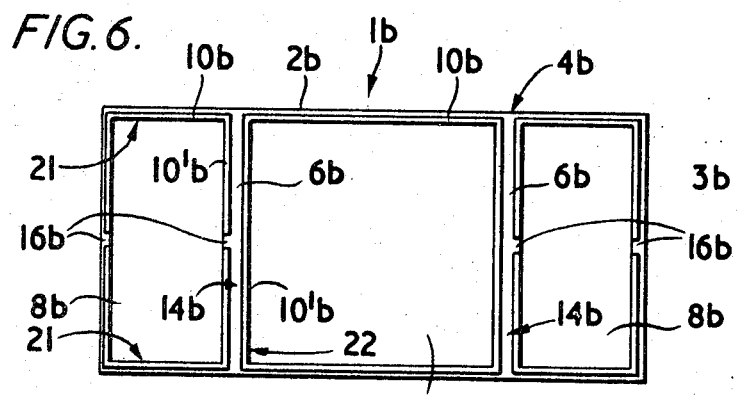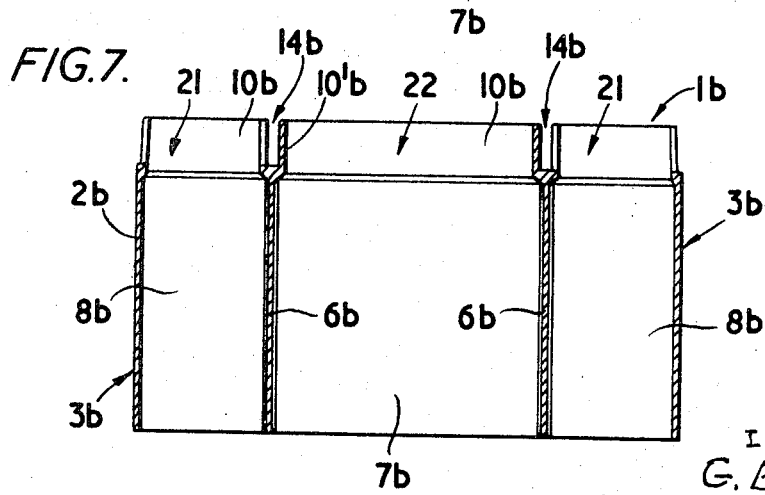

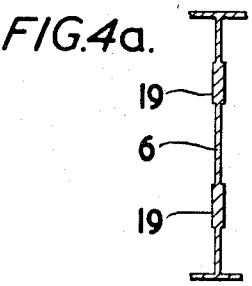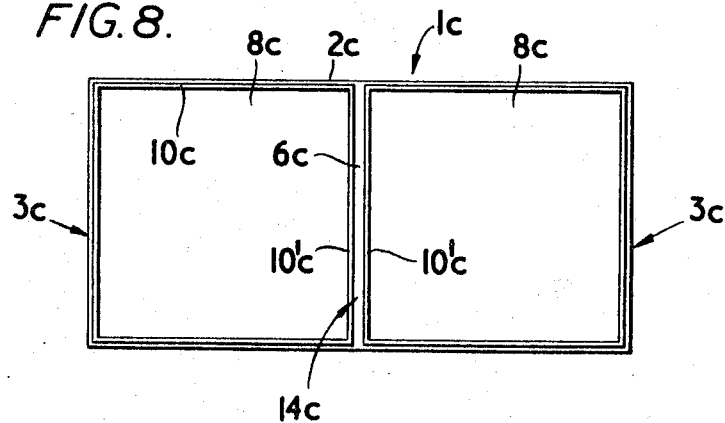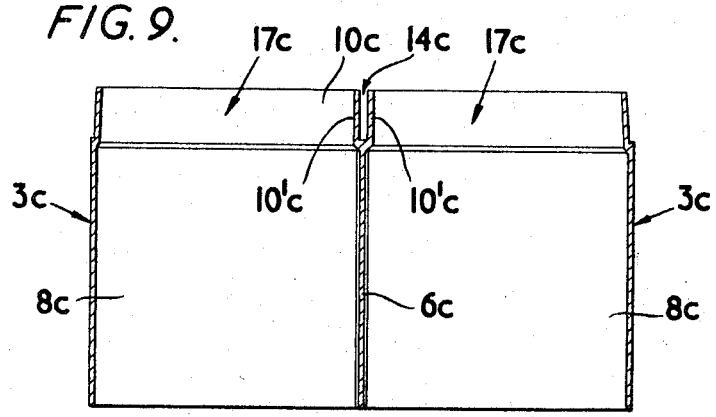

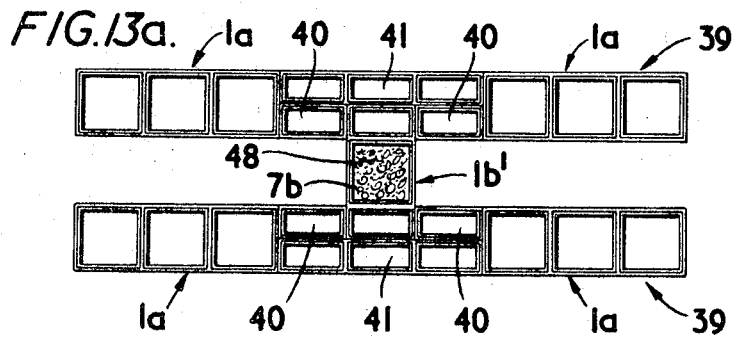
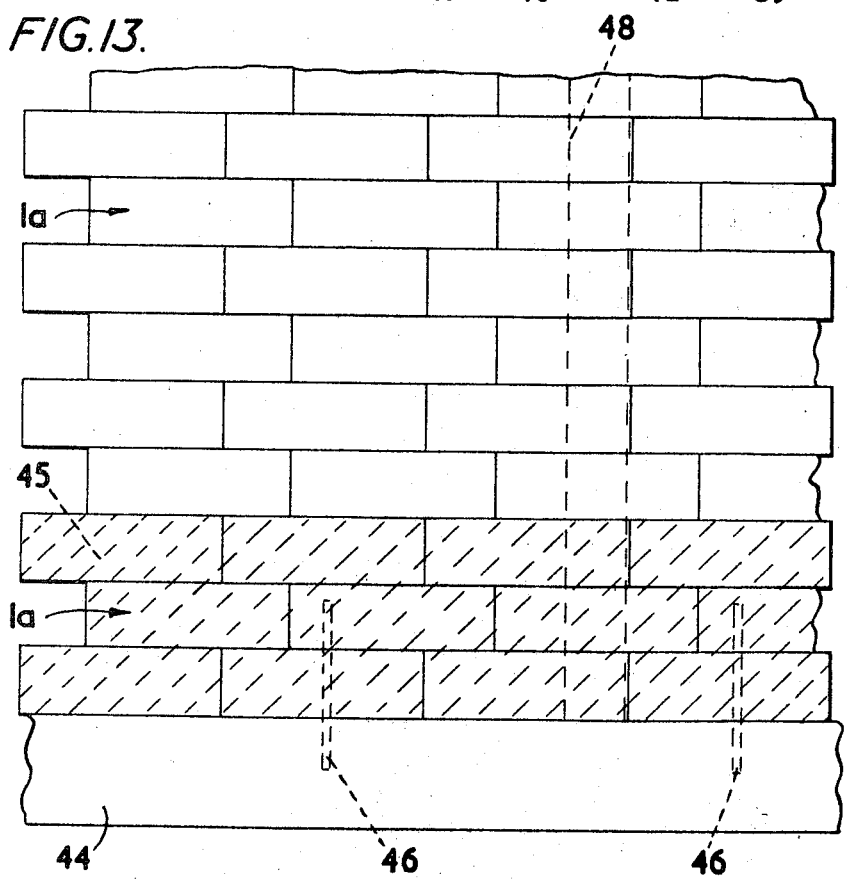
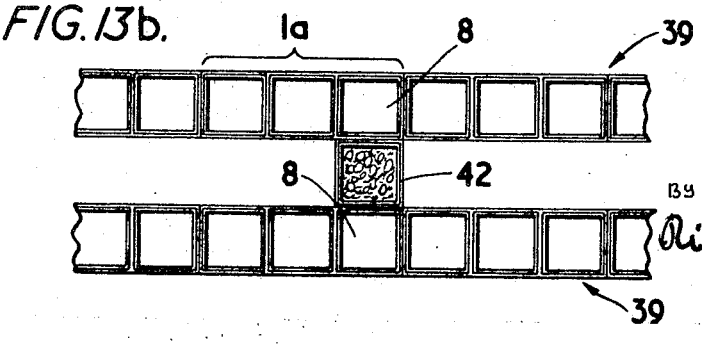

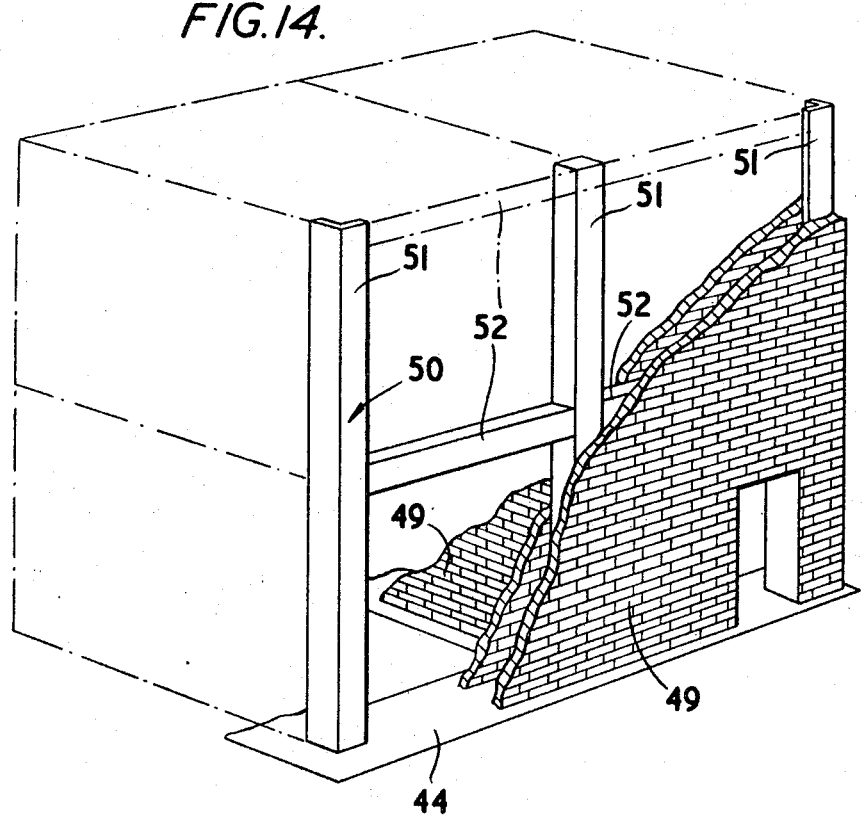

3,449,878
Patented June 17, 1969

3,449,878
BUILDING BRICKS OR BLOCKS AND STRUCTURES UTILISING THE SAME
Geoffrey Benjamin Hern, "Byecroft," Bircher, near Leominster, England
Filed Mar. 22, 1967, Ser. No. 630,781
Claims priority, application Great Britain, Mar. 30, 1966, 14,023/66
Int. Cl. E02d 27/32; E04b 2/18; E04c 1/10
U.S. Cl. 52—293                       9 Claims

ABSTRACT OF THE DISCLOSURE

A building block is formed of a hollow box having at least one inner vertical partition dividing the interior of the box into a plurality of cells open at top and bottom. Flanges or lugs are located at the top of the outer wall of the box and at the top of the partition or partitions and form channels adapted to interlock with a similar staggered upper block. Thus walls are formed with laterally closed vertical spaces produced by aligned cells of staggered blocks.

---

Figure 10:
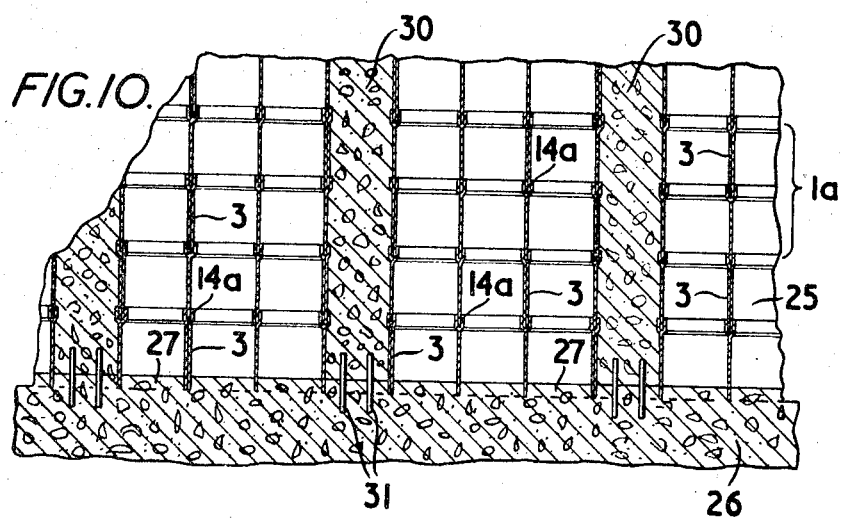

The present invention is concerned with improved forms of building bricks or blocks having a hollow cellular interior and means for enabling interlocking engagement with similar adjacent bricks or blocks. The invention also relates to structures assembled from building bricks or blocks of the above kind.

According to the invention, a building brick or block is integrally-formed and consists of a hollow box-like body with parallel sides having an outer peripheral wall and having at least one internal vertical transverse partition extending throughout the full depth of the body and dividing the hollow interior into a plurality of separate cells which also have parallel sides and which are open at top and bottom, the top of the peripheral wall and of each partition being formed with upstanding flanges or lugs which extend along each side around each separate cell and constitute spigot parts adapted to fit within and interlock in located position with the open lower end of the cellular interior of a like brick or block assembled above so that vertically aligned cells intercommunicate to form a continuous laterally-closed vertically-extending tubular space, each partition having pairs of said upstanding spigot flanges or lugs extending along the opposite edges which form the sides of adjacent cells and spaced apart to form opposite sides of an open channel which has a width sufficient to accommodate the combined thickness of the lower edge portion of two opposite sides of the peripheral wall and which extends transversely across the body along said partition whereby successive courses of like bricks or blocks can be assembled in longitudinally staggered or offset superposed relationship, with sets of vertically aligned cells sealed off from each other.

In a preferred form of building brick or block in accordance with the invention, the internal partitioning divides up the interior space symmetrically and produces interior cells of square or half-square rectangular cross-section. Gaps may be provided centrally between adjacent spigot flange or lug portions extending along at least each of the transverse sides of at least one cell, these gaps having a width equal to twice the thickness of the lower edge portion of the peripheral wall and enabling adjacent similar bricks or blocks to be fitted together at right angles to one another in superposed relationship with half of a cell in the lower brick or block overlapped by the end cell of each brick or block immediately above, thereby increasing the possible ways in which the bricks or blocks can be assembled together.

Building bricks or blocks in accordance with the invention and having three interior cells have been found to be particularly useful, especially in assembling branched wall structures and in assembling cavity walls where they may be utilised as transverse tie bricks.

Preferably, the building bricks or blocks are moulded in one-piece in a plastics material, such as, for example, rigid polyvinylchloride or polystyrene, and they can be built-up into wall or panelling structures incorporating additional load-bearing reinforcing means, or they may be used for cladding a main load-carrying open framework of a building structure, either with or without additional reinforcing means.

The use of a plastics material is of great advantage in many applications of these building bricks or blocks which can then readily be produced as precision thin-walled mouldings so dimensioned that in a wall assembly, adjacent bricks or blocks in one course will be drawn together and stressed horizontally by the interlocking engagement of the bricks or blocks in the adjacent courses.

When gaps are required in the spigot parts, it may usually be preferable to mould the brick or block initially with continuous spigot flanges, and the gaps can then be cut, as necessary, in a subsequent operation.

Figure 11:
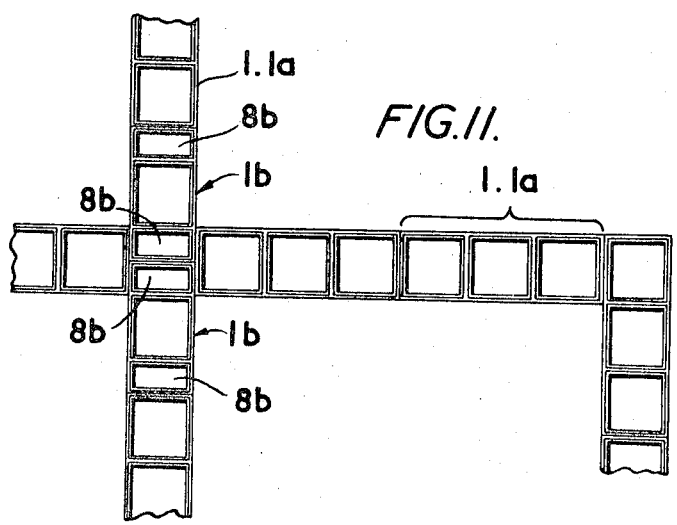
Figure 12:
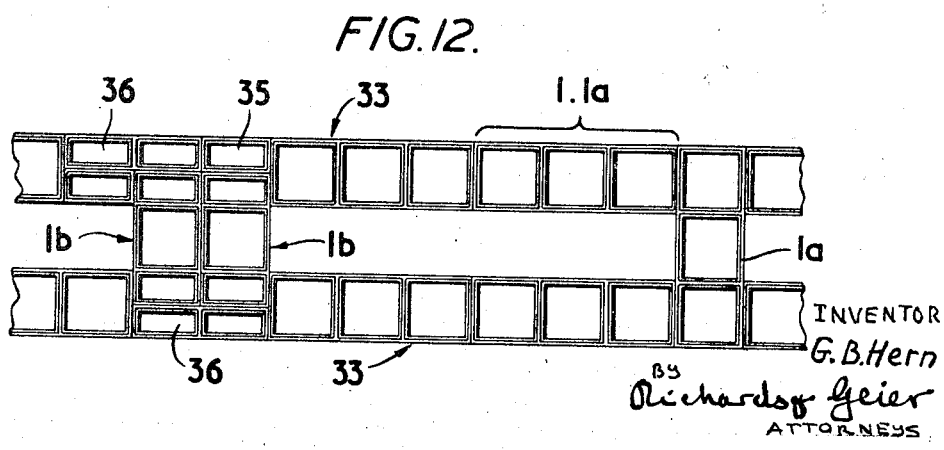

By way of example, convenient embodiments of the invention will now be more particularly described with reference to the accompanying drawings, in which:

FIGURE 1 is a top perspective view of one form of building brick or block in accordance with the invention;
FIGURE 2 is a plan view of the brick or block of FIGURE 1;
FIGURE 3 is a side elevational view;
FIGURE 4 is a longitudinal section on line IV—IV of FIGURE 2;
FIGURE 4a is a section on line IVa—IVa of FIGURE 4;
FIGURE 5 is a perspective view similar to FIGURE 1 showing another preferred form;
FIGURES 6 and 7 are plan and longitudinal sectional views respectively of another modified form of building brick or block;
FIGURES 8 and 9 are plan and longitudinal sectional views respectively illustrating a further modified form;
FIGURE 10 is a part-sectional view of an assembled wall structure;
FIGURE 11 is a plan view showing diagrammatically a course of a branched wall structure;
FIGURE 12 is a plan view showing diagrammatically a course of a cavity wall assembly;
FIGURE 13 is an elevational view of a reinforced cavity wall assembly, and FIGURE 13a and FIGURE 13b are plan views of alternate courses thereof; and
FIGURE 14 is a diagrammatic perspective view, partly broken away, illustrating a building structure having a main load-carrying open framework clad with building bricks or blocks in accordance with this invention.

The building brick or block illustrated in FIGURES 1–4 of the drawings has a hollow rectangular box-like body 1 and is moulded in one piece in a suitable plastics material, such as polypropylene or polyvinylchloride for example.

The box-like body 1 has a thin outer peripheral wall 2 with plane ends 3 and sides 4, and the hollow interior is divided by two internal vertical transverse partitions 6, 6, extending throughout the full depth, into three separate cells, a central cell 7 and two end cells 8, 8 which are of equal size and square cross-section and which are open at top and bottom.

Along the top, the ends 3 and sides 4 of the peripheral wall 2 have a stepped formation with an inwardly-offset, slightly tapered, upstanding flange portion 10 rising from the step or shoulder 11 and overlying the hollow interior, the outer face 12 of each flange portion 10 being in the same vertical plane as the inner face of the respective end or side of the peripheral wall whereby maximum economy in the amount of material comprising the body is obtained.

The top of each transverse partition 6, 6, also has a similar but duplicated form with upstanding flanges 10' extending along opposite edges and overlying the respective faces of the partition which form sides of the adjacent cells 7 and 8. These parallel flanges 10' along opposite edges are spaced apart and effectively form opposite sides of an open channel 14 which has a width equal to twice the thickness of the peripheral wall 2 and which extends transversely across the body 1 along the respective partition 6.

In this particular embodiment illustrated, portions of the upstanding flanges 10 and 10' above described are separated at the middle of each longitudinal side of each cell 7 and 8 by a gap 15, and at the middle of each transverse side of each cell 7 and 8 by a gap 16, these gaps 15 and 16 also each having a width equal to twice the thickness of the peripheral wall 2. Thus, there is produced at each corner of each cell upstanding spigot parts 17 of right-angle L-shape in plan which are adapted to engage within and interlock with the open lower ends of similar bricks or blocks assembled above.

As indicated in FIGURE 4a, the partitions 6 are each formed with a pair of vertical strengthening ribs 19 which at their lower ends fit closely into a channel 14 of a brick below when wall erections are assembled.

The spigot parts 17 may conveniently be such a size that they will enage within the open lower ends of similar bricks or blocks with a push fit, advantage being obtained from a very slight resilient characteristic of the plastics material of which they are composed. More important, however, is a preferred feature of the bricks or blocks 1 being so dimensioned that when assembled together to produce a wall, adjacent bricks or blocks in one course are forced together by interlocking engagement of the bricks or blocks in adjacent courses and a horizontal stressing is thereby introduced in the structure, even when the thin walled structure is composed of a basically rigid plastics material.

Each brick or block may conveniently have an overall size of 12" x 4", excluding the height of the spigot parts 17, in order to fit with maximum adaptability into assemblies arranged in accordance with a modular system based on a fundamental 4" unit.

The building brick or block 1a illustrated in FIGURE 5 is identical with that already described except that the upstanding flange portions, 10a and 10'a, are continuous without gaps and form spigot parts 17a which are square in plan. The transverse channels formed by the partition flange portions 10'a are denoted by the references 14a, but otherwise the same references are used as in the first embodiment to indicate like parts.

The building brick or block 1b illustrated in FIGURES 6 and 7 is similar to those already described and comprises a hollow rectangular box-like body of moulded plastics material having two transverse partitions 6b, 6b, which divide the hollow interior symmetrically to produce a centre square cell 7b intermediate two end cells 8b, 8b, each cell being open at top and bottom and being surrounded at the top by upstanding flange portions 10'b extending along the outer peripheral wall 2b and 10'b extending along the sides 4b and end 3b of the partitions 6b, 6b, which constitute spigot parts adapted to engage within and interlock with the open lower end of a similar brick or block above. In this embodiment, the transverse channels formed by the flange portions 10'b along each partition are denoted by the references 14b, and the two end cells 8b, 8b, are each of rectangular form equal to half the size of the central square cell 7b. The flange portions 10b and 10'b surrounding these end cells 8b together form a pair of spigot parts 21, 21, which are of right-angled U-shaped channel section in plan separated by gaps 16b midway along the transversely-extending walls, but the flange portions 10b and 10'b surrounding the central cell 7b are continuous without any gaps and form a single spigot part 22.

The modified building brick or block 1c illustrated in FIGURES 8 and 9 is also similar to that of the first embodiment except that the hollow rectangular body has only a single internal partition 6c, midway between the end wall portions 3c, dividing the interior into two square cells 8c, 8c, of equal size. Again, the top partition 6c are formed with inwardly-offset upstanding flange portions 10c and 10'c forming square spigot parts 17c which are adapted to fit and interlock in the open lower ends of the cells of similar bricks or blocks above and which are separated by a transverse channel 14c.

In building up a single wall erection utilising, for example, three-cell bricks 1a in accordance with the embodiment of FIGURE 5, as indicated in FIGURE 10, a bottom course 25 may, if desired, be laid on a prefabricated concrete foundation or locating base template 26 which could be made-up from a number of separate aligned sections and which has upstanding locating projections 27 adapted to engage within and interlock with the open lower ends of the bricks. Other courses are then laid with the bricks of each course interlocked or bonded in staggered relation to those above and below, so as to break joint, with the opposed ends 3 of two adjacent bricks in contact under pressure and their lower edge portions together fitted in the open channel 14a between the upstanding spigot flanges 10'a on one of the partitions 6 of a brick in the course below.

The interior cells 7 and 8 of the bricks in all the different courses are thus aligned vertically and form a series of continuous laterally-closed tubular spaces extending throughout the whole height of the structure. A selected number of these vertical tubular spaces may then advantageously be filled with reinforcement, such as concrete with or without metal reinforcing bars embedded therein or with metal tubes adapted to fit closely against the side walls of the tubular spaces, in order to provide a seriees of load-supporting pillars or columns, as indicated at 30, spaced along the length of the structure. With a concrete filling material, the lower ends of the pillars or columns 30 formed thereby may be bonded to the concrete foundation 26 by upstanding tie bars 31 embedded in the latter as illustrated.

If necessary, the wall structure may also incorporate bricks having a different number of internal cells, or even single cell spacer bricks also having upstanding spigot parts similar to those of the main bricks.

In erecting branched wall structures, three cell bricks having narrow end cells, as in the second embodiment of FIGURES 6 and 7, may be particularly useful, and by way of example, a typical arrangement for one course is illustrated in FIGURE 11. This shows the narrow end cell bricks 1b assembled with the normal full size three cell bricks 1 or 1a. At the branch point, the end wall portions of the narrow cells, 8b, are fitted into the gaps 16 in the middle of the transverse walls of the adjacent cell of brick 1 below. With the gaps 15 and 16, a large variety of other assembly arrangements are also possible. In general, in erecting a wall or other structure, the ends of the bricks of one course may either be fitted into a channel 14 along a partition of a brick below, as previously described, or they may enter the gaps provided at the middle of the sides of cells in such bricks below.

Cavity wall assemblies may be built up by two spaced-apart wall erections each composed of interlocking bricks or blocks as hereinbefore described, and these erections may be linked together at intervals by common transversely-disposed tie bricks of similar construction.

In the example illustrated in FIGURE 12, bricks 1b according to the second main embodiment with narrow end cells are used to tie or link together two spaced main wall erections 33, 33, composed mainly of full size three cell bricks 1 or 1a together with some narrow filler bricks, such as indicated at 35 and 36, of smaller size. The ends of the tie bricks 1b in this assembly are fitted into the gaps in the ends and partitions of bricks in the longitudinal side rows of the course beneath, and a variety of interlocking or bonding arrangements are available for fitting the bricks of the course above.

The long three cell bricks 1 or 1a of the first described main embodiment may be used directly as tie bricks in a cavity wall assembly as also indicated in FIGURE 11, and, in many cases, this may be preferred as a simpler arrangement.

Another preferred form of cavity wall construction is shown in FIGURES 13, 13a and 13b. This comprises two spaced wall erections 39, 39, composed mainly of triple square cell plastic bricks or blocks 1a of the form shown in FIGURE 5, with shorter narrow end cell bricks 1b', similar to those of the second embodiment but without gaps in the spigot flanges, used in alternate courses as tie bricks in conjunction with single and triple narrow cell filler bricks 40, 41, as shown in FIGURE 13a. In the intermediate courses, illustrated in FIGURE 13b, single cell square filler bricks or blocks 42 are assembled within the wall cavity in vertical alignment, with the square central cell 7b of the tie bricks 1b', so as to provide closed tubular spaces extending vertically through the cavity for the full height of the structure.

As indicated in FIGURE 13, the wall assembly is built-up on a concrete base or foundation 44, and during construction all the interior cells of the bricks or blocks in the three lowermost courses are completely filled with concrete, indicated at 45, and upstanding metal tie bars 46 are provided at intervals for bonding to said base or foundation 44.

Finally, the vertical tubular spaces passing through the central cells 7b of the tie bricks 1b' are completely filled with concrete which may be reinforced with metal bars, or hollow square steel tubes are inserted to produce a number of centrally-disposed load-supporting pillars or columns spaced along the length of the structure, as indicated at 48.

FIGURE 14 llustrates the use in a building structure of wall erections 49 composed of interlocking cellular bricks of the kind herein disclosed for cladding a main load-carrying open framework 50 of rectangular form with pillar members 51 linked by horizontal cross-members 52.

This manner of construction is especially suitable for domestic dwelling houses and other buildings, and in building up such cladding walls, gaps or spaces may be left as necessary for fitting doors and window frames.

If desired, the bricks or blocks may have bevelled corner edges and a decorative surface finish which may readily be produced with a plastics material, but in other cases, the bricks or blocks may have plane unbevelled exterior faces so that in wall structures built-up therefrom, a continuous smooth outer surface is produced which can be directly papered or painted, if desired, without first applying a layer of plaster.

I claim:

1. A building structure comprising a wall assembly composed of courses comprising building blocks, each of said building blocks comprising an outer peripheral wall of thin moulding of plastic material defining a parallel-sided rectangular box-like body the length of which is a multiple of its width, said body being open on top and bottom, integral internal vertical transverse partitions of thin plate-like form extending the full depth of the body and dividing the interior space of the body symmetrically into a central cell and two end cells of equal size and rectangular cross section, short plate-like flange portions upstanding from the top of said outer peripheral wall and short pairs of plate-like flange portions of the same height as the first-mentioned flange portions and upstanding from opposite edges of the top of each partition to define a channel of a width commensurate with two wall thicknesses, said short plate-like flange portions upstanding from the outer peripheral wall and the partitions are provided with centrally disposed gaps also of a width commensurate with two wall thicknesses, said blocks being assembled in superposed courses with divisions between the blocks in each course being according to a break-joint pattern and with the ends of two adjacent blocks in at least one course fitted to overlap opposite halves of a cell of a block aligned transversely in a course below, the cells of the blocks in different courses forming a series of continuous laterally-closed tubular spaces extending vertically throughout the height of the structure, and concrete filling some of said tubular spaces to provide load supporting columns.

2. A building block as claimed in claim 1 wherein the flange portions extending around the sides of at least the end cells are in the form of symmetrically disposed projections which in plan are L-shaped and embrace the corner.

3. A building structure as claimed in claim 1 comprising a concrete material filling all the interior cells of the building blocks in the lowermost courses.

4. A building structure as claimed in claim 3 further comprising a foundation and upstanding tie bars incorporated in the foundation and embedded in the concrete material.

5. A building structure as claimed in claim 1 further comprising a prefabricated base template, and locating projections upstanding from said template, said locating projections engaging within the open lower ends of the blocks of the bottom course.

6. A building structure as claimed in claim 1 wherein the wall assembly comprises a pair of parallel spaced apart wall erections, each erection being built up of the courses of the blocks, and wherein other blocks are disposed transversely to interlock by their end cells with blocks of each wall erection to serve as tie blocks.

7. A building structure as claimed in claim 6 wherein said tie blocks have a central cell which extends across the width of the space between the wall erections.

8. A building structure as claimed in claim 7 wherein the central cells of the tie blocks together define laterally closed continuous vertically extending tubular spaces, and reinforcements within said tubular spaces to provide a series of load supporting columns spaced at intervals along the length of the wall assembly within the space between the wall erections.

9. A building block as claimed in claim 1, wherein said transverse partitions comprise spaced vertical strengthening ribs having lower ends fitting closely into a channel of a lower block when wall erections are assembled.

References Cited

UNITED STATES PATENTS

| 903,907 | 11/1908 | Soss | 52—284 X |
| 1,607,583 | 11/1926 | Bader | 52—439 |
| 2,141,397 | 12/1938 | Locke | 52—274 X |
| 3,305,982 | 2/1967 | Steele | 46—25 |

FOREIGN PATENTS

| Ad. 53,998 | 9/1946 | France. |
| 1,156,862 | 12/1957 | France. |
| 613,245 | 11/1948 | Great Britain. |
| 735,945 | 8/1955 | Great Britain. |

JOHN E. MURTAGH, *Primary Examiner.*

U.S. Cl. X.R.

52—309, 424, 428, 439, 561, 589